(12) United States Patent
Ikeno et al.

(10) Patent No.: US 11,087,757 B2
(45) Date of Patent: Aug. 10, 2021

(54) DETERMINING A SYSTEM UTTERANCE WITH CONNECTIVE AND CONTENT PORTIONS FROM A USER UTTERANCE

(71) Applicant: TOYOTA JIDOSHA KABUSHIKI KAISHA, Toyota (JP)

(72) Inventors: Atsushi Ikeno, Kyoto (JP); Yusuke Jinguji, Hiroo-gun (JP); Toshifumi Nishijima, Kasugai (JP); Fuminori Kataoka, Nisshin (JP); Hiromi Tonegawa, Okazaki (JP); Norihide Umeyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/390,261

(22) Filed: Apr. 22, 2019

(65) Prior Publication Data

US 2019/0244620 A1    Aug. 8, 2019

Related U.S. Application Data

(63) Continuation of application No. 15/704,691, filed on Sep. 14, 2017, now Pat. No. 10,319,379.

(30) Foreign Application Priority Data

Sep. 28, 2016   (JP) ................................. 2016-189406

(51) Int. Cl.
   *G10L 15/22*   (2006.01)
   *G10L 13/08*   (2013.01)
   (Continued)

(52) U.S. Cl.
   CPC .............. *G10L 15/22* (2013.01); *G10L 13/08* (2013.01); *G10L 15/1815* (2013.01); *G10L 15/30* (2013.01); *G10L 2015/223* (2013.01)

(58) Field of Classification Search
   CPC ....... G10L 13/08; G10L 15/22; G10L 15/222; G10L 2013/083; G10L 2015/221; G10L 2015/223; G10L 15/1815
   (Continued)

(56) References Cited

U.S. PATENT DOCUMENTS

| 7,197,460 B1 * | 3/2007 | Gupta ..................... G10L 15/22 |
|---|---|---|
| | | 704/270.1 |
| 7,321,856 B1 | 1/2008 | Porter et al. |

(Continued)

FOREIGN PATENT DOCUMENTS

| JP | 2004-151562 A | 5/2004 |
|---|---|---|
| JP | 2014-077969 A | 5/2014 |
| JP | 2016-501391 A | 1/2016 |

OTHER PUBLICATIONS

Sep. 11, 2018 Office Action issued in U.S. Appl. No. 15/704,691.
(Continued)

*Primary Examiner* — Martin Lerner
(74) *Attorney, Agent, or Firm* — Oliff PLC (57) ABSTRACT

Described is a voice dialogue system that includes a voice input unit which acquires a user utterance, an intention understanding unit which interprets an intention of utterance of a voice acquired by the voice input unit, a dialogue text creator which creates a text of a system utterance, and a voice output unit which outputs the system utterance as voice data. When creating a text of a system utterance, the dialogue text creator creates the text by inserting a tag in a position in the system utterance, and the intention understanding unit interprets an utterance intention of a user in accordance with whether a timing at which the user utterance is made is before or after an output of a system utterance at a position corresponding to the tag from the voice output unit.

6 Claims, 5 Drawing Sheets

(51) Int. Cl.
*G10L 15/18* (2013.01)
*G10L 15/30* (2013.01)

(58) Field of Classification Search
USPC ........ 704/231, 251, 253, 254, 260, 270, 275
See application file for complete search history.

(56) References Cited

U.S. PATENT DOCUMENTS

| | | | |
|---|---|---|---|
| 7,853,451 B1 | 12/2010 | Gupta et al. | |
| 8,600,753 B1 | 12/2013 | Conkie | |
| 8,799,000 B2* | 8/2014 | Guzzoni | G10L 15/22 704/270.1 |
| 8,903,716 B2* | 12/2014 | Chen | G10L 15/22 704/275 |
| 9,792,901 B1 | 10/2017 | Saleem et al. | |
| 10,319,379 B2* | 6/2019 | Ikeno | G10L 13/08 |
| 2002/0087312 A1* | 7/2002 | Lee | G10L 15/183 704/251 |
| 2002/0184031 A1 | 12/2002 | Brittan et al. | |
| 2003/0093274 A1* | 5/2003 | Thompson | G10L 15/22 704/246 |
| 2003/0163309 A1 | 8/2003 | Yamada et al. | |
| 2003/0191648 A1* | 10/2003 | Knott | G10L 15/22 704/275 |
| 2005/0015256 A1* | 1/2005 | Kargman | G06Q 30/06 704/272 |
| 2006/0020471 A1* | 1/2006 | Ju | G10L 15/22 704/275 |
| 2006/0080101 A1 | 4/2006 | Chotimongkol et al. | |
| 2010/0324896 A1 | 12/2010 | Attwater et al. | |
| 2013/0006643 A1 | 1/2013 | Lindahl et al. | |
| 2013/0218574 A1* | 8/2013 | Falcon | G10L 15/22 704/275 |
| 2014/0156276 A1 | 6/2014 | Nakano et al. | |
| 2014/0180697 A1 | 6/2014 | Torok et al. | |
| 2014/0278404 A1 | 9/2014 | Holmes et al. | |
| 2014/0324438 A1 | 10/2014 | Hofstader et al. | |
| 2015/0019217 A1* | 1/2015 | Di Cristo | G10L 15/22 704/235 |
| 2015/0179175 A1 | 6/2015 | Torok et al. | |
| 2015/0348533 A1 | 12/2015 | Saddler et al. | |
| 2016/0300570 A1* | 10/2016 | Gustafson | G10L 15/22 |
| 2016/0314787 A1 | 10/2016 | Hanada | |
| 2016/0372138 A1* | 12/2016 | Shin Kai | G10L 15/22 |
| 2018/0090132 A1 | 3/2018 | Ikeno et al. | |

OTHER PUBLICATIONS

Jan. 24, 2019 Notice of Allowance issued in U.S. Appl. No. 15/704,691.

U.S. Appl. No. 15/704,691, filed Sep. 14, 2017 in the name of Atsushi Ikeno et al.

* cited by examiner

DETERMINING A SYSTEM UTTERANCE WITH CONNECTIVE AND CONTENT PORTIONS FROM A USER UTTERANCE

CROSS-REFERENCE TO RELATED APPLICATIONS

This application is a continuation of U.S. patent application Ser. No. 15/704,691 filed Sep. 14, 2017, now U.S. Pat. No. 10,319,379 issued Jun. 11, 2019, which claims priority under 35 USC 119 from Japanese Patent Application No. 2016-189406 filed Sep. 28, 2016, the entire disclosures of which are hereby incorporated by reference in their entireties.

BACKGROUND OF THE INVENTION

Field of the Invention

The present invention relates to a voice dialogue system and particularly to a voice dialogue system accommodating barge-in utterances.

Description of the Related Art

In a voice dialogue system, when a system utterance and a user utterance overlap each other, a determination is desirably made on whether or not the user is responding to a current system utterance.

Japanese Patent Application Laid-open No. 2014-77969 discloses determining, when a system utterance and a user utterance overlap each other, whether or not a target user utterance is directed toward a dialogue system based on a length of the target user utterance, a time relationship between the target user utterance and an immediately previous utterance, a state of the system, and the like. According to this method, a user utterance to which the dialogue system must respond and a user utterance such as a monologue to which the dialogue system need not respond can be distinguished from each other.

However, with the method described in Japanese Patent Application Laid-open No. 2014-77969, even when a determination can be made that a user utterance overlapping a system utterance is directed toward the voice dialogue system, a determination cannot be made on whether or not the user utterance is a response to a system utterance currently being output.

User utterances can be classified into, for instance, those responding to a system utterance currently being output, those responding to a last system utterance, and those spontaneously made to the voice dialogue system by a user. When a system utterance and a user utterance overlap each other, a determination is desirably made on whether or not the user's intention is to respond to a current system utterance.

An object of the present invention is to accurately determine an utterance intention of a user when a system utterance and a user utterance overlap each other in a voice dialogue system.

Patent Document 1: Japanese Patent Application Laid-open No. 2014-77969

SUMMARY OF THE INVENTION

A first aspect is a voice dialogue system, including:
a voice input unit configured to acquire a user utterance;
an intention understanding unit configured to interpret an intention of utterance of a voice acquired by the voice input unit;
a dialogue text creator configured to create a text of a system utterance; and
a voice output unit configured to output the system utterance as voice data, wherein
the dialogue text creator is further configured to, when creating a text of a system utterance, create the text by inserting a tag in a position in the system utterance, and
the intention understanding unit is interpret an utterance intention of a user in accordance with whether a timing at which the user utterance is made is before or after an output of a system utterance at a position corresponding to the tag from the voice output unit.

In this manner, by embedding a tag into a system utterance, determination whether or not a user utterance is a response to a system utterance currently being output can be made depending on whether a start timing of the user utterance is before or after an utterance of a sentence (word) at a position corresponding to the tag.

In the present aspect, the intention understanding unit may interpret that, when the timing at which the user utterance is made is after the output of the system utterance sentence at the position corresponding to the tag from the voice output unit, the user utterance is a response to the system utterance, and may interpret that, when the timing at which the user utterance is input is before the output of the system utterance sentence at the position corresponding to the tag from the voice output unit, the user utterance is not a response to the system utterance.

In addition, in the present aspect, the dialogue text creator may generate the system utterance as a combination of a connective portion and a content portion and embed the tag between the connective portion and the content portion. However, a position of the tag need not be between the connective portion and the content portion and may be, for example, a position in the content portion where it is assumed that the user is able to understand an intention of a system utterance by listening to contents up to the position.

Furthermore, in the present aspect, the intention understanding unit may calculate a first period of time, which is a period of time from the output of the system utterance from the voice output unit until the output of all texts preceding the tag from the voice output unit, acquire a second period of time, which is a period of time from the output of the system utterance from the voice output unit until the start of input of the user utterance, and compare the first period of time and the second period of time with each other to determine whether the timing at which the user utterance is made is before or after the output of a system utterance at the position corresponding to the tag from the voice output unit.

In addition, in the present aspect, the voice output unit desirably does not output as a voice the tag in the text of the system utterance sentence.

Moreover, the present invention can be considered a voice dialogue system including at least a part of the units described above. In addition, the present invention can also be considered a voice dialogue method which executes at least a part of the processes described above. Furthermore, the present invention can also be considered a computer program that causes the method to be executed by a computer or a computer-readable storage medium that non-transitorily stores the computer program. The respective units and processes described above can be combined with one another to the greatest extent possible to constitute the present invention.

According to the present invention, in a voice dialogue system, an utterance intention of a user can be accurately determined even when a system utterance and a user utterance overlap each other.

DESCRIPTION OF THE EMBODIMENTS

A preferred embodiment of the present invention will now be exemplarily described in detail with reference to the drawings. While the embodiment described below is a system in which a voice dialogue robot is used as a voice dialogue terminal, a voice dialogue terminal need not be a robot and an arbitrary information processing apparatus, a voice dialogue interface, and the like can be used.

<System Configuration>

Figure 1:
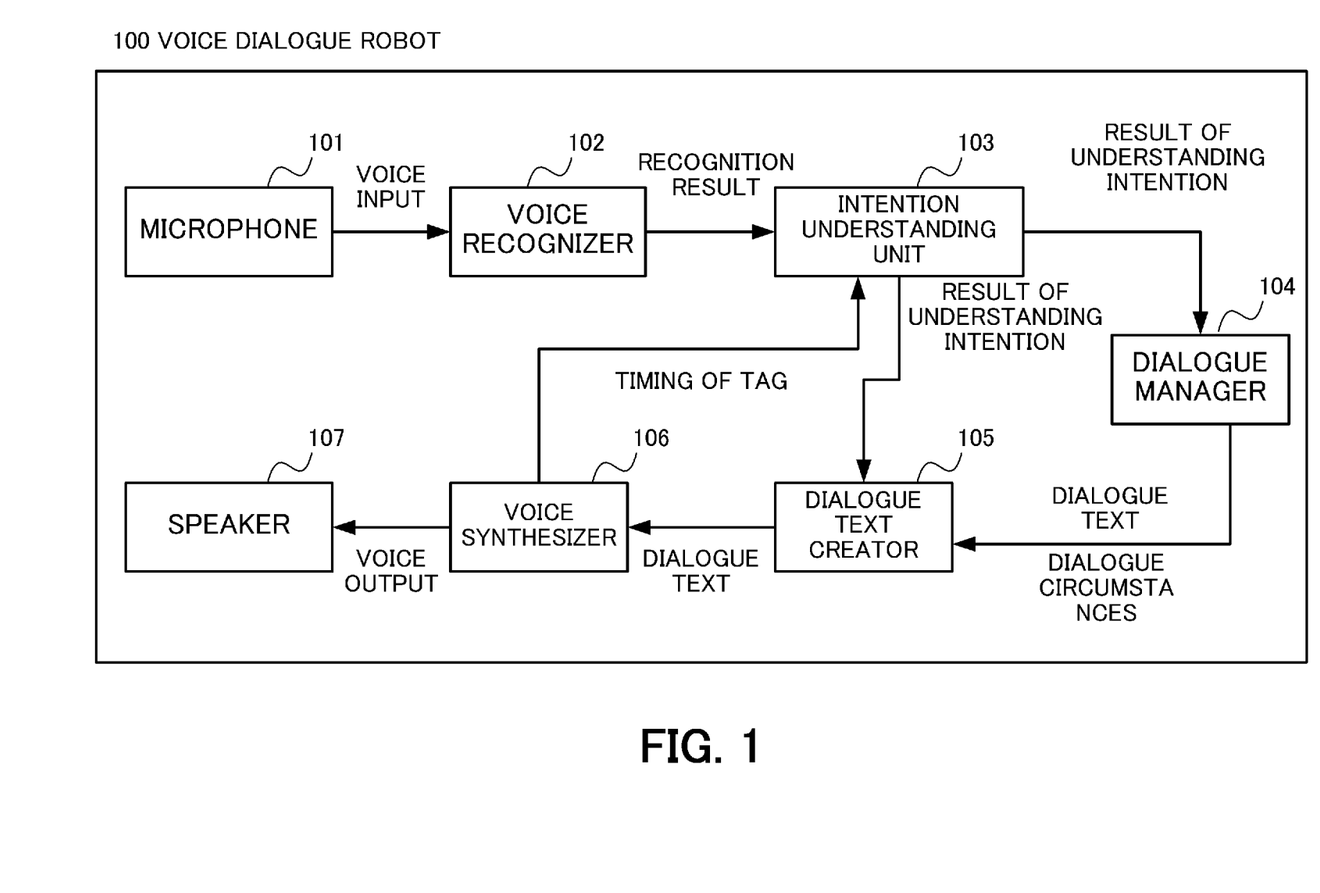
FIG. 1 is a diagram showing a configuration of a voice dialogue system according to an embodiment.

FIG. 1 is a diagram showing a configuration of a voice dialogue system (a voice dialogue robot) according to the present embodiment. A voice dialogue robot 100 according to the present embodiment is a computer including a microphone (a voice input unit) 101, a speaker (a voice output unit) 107, a processing unit such as a microprocessor, a memory, and a communication apparatus. When the microprocessor executes a program, the voice dialogue robot 100 functions as a voice recognizer 102, an intention understanding unit 103, a dialogue manager 104, a dialogue text creator 105, and a voice synthesizer 106. Although not shown, the voice dialogue robot 100 may include an image acquisition apparatus (camera), movable joints, and moving mechanism.

The voice recognizer 102 performs processing such as noise elimination, sound source separation, and feature amount extraction with respect to voice data of a user utterance input from the microphone 101 and converts contents of the user utterance into a text. The voice recognizer 102 also acquires a timing (a time point) at which the user utterance is made to the microphone 101.

Moreover, the voice recognizer 102 is configured to be able to understand a user utterance made during a system utterance. A user utterance during a system utterance is referred to as a barge-in utterance (interrupting utterance). The voice recognizer 102 is adapted to handle a barge-in utterance and is capable of extracting and recognizing a user utterance by suppressing self-utterances in voice data inputted to the microphone 101.

The intention understanding unit 103 interprets (understands) an utterance intention of the user based on a recognition result (a text of utterance contents, an utterance feature, and the like) of the voice recognizer 102. The intention understanding unit 103 stores a corpus or a dictionary for interpreting utterance contents and interprets an utterance by the user by referring to the corpus or the dictionary.

The intention understanding unit 103 also determines whether or not a barge-in utterance by the user is a response to a current system utterance. Moreover, a barge-in utterance not being a response to a current system utterance includes both a case where the barge-in utterance is a response to a system utterance preceding the current system utterance and a case where the user spontaneously talks to the robot. Details of processing for determining whether or not a barge-in utterance is a response to a current system utterance will be described later. A result of understanding of the utterance intention of a user utterance by the intention understanding unit 103 is sent to the dialogue manager 104 and the dialogue text creator 105.

The dialogue manager 104 stores a history of dialogue performed in the past between the system and the user. The dialogue manager 104 not only manages contents of a dialogue but also manages circumstances (for example, a time and date or a location) in which the dialogue was performed. The dialogue manager 104 enables what kind of conversation had taken place with the user to be discerned and a response using previous dialogue as a reference to be generated.

The dialogue text creator 105 receives a result of interpretation of the intention of a user utterance from the intention understanding unit 103 and creates a dialogue text of an utterance (a system utterance) for responding to the user utterance. In the present specification, a dialogue text of a system utterance is also referred to as a system utterance sentence or a system dialogue text. The dialogue text creator 105 creates a system dialogue text by referring to contents of previous dialogue (including contents of a current dialogue) stored in the dialogue manager 104, user information, and the like. The dialogue text creator 105 stores a dialogue scenario database and may create a response sentence using a dialogue scenario stored in the database. The dialogue text created by the dialogue text creator 105 is sent to and stored in the dialogue manager 104.

A dialogue text of a system response is created by embedding a "tag" for notifying a timing of determining whether or not a barge-in utterance by the user is a response to a current utterance. The dialogue text creator 105 creates a response sentence as a sum of a connective portion and a body (a content portion). In doing so, the tag is inserted between the connective and the body. For example, when creating a text by splicing a connective of "Hey" and a body of "What's your name?", a text reading "Hey, <1> what's your name?" is generated. In this case, "<1>" corresponds to the tag. In addition, when splicing "By the way" and "What's tomorrow's weather?", "By the way, <2> what's tomorrow's weather?" is created. In this case, while the numerals in the tags are for identifying the tags, when only one tag is to be included in one sentence (response), a variable sign such as numerals need not necessarily be used.

The voice synthesizer 106 receives a text of utterance contents and performs voice synthesis to generate response voice data. The response voice data generated by the voice synthesizer 106 is reproduced from the speaker 107. In doing so, the tag included in a text is not output as a voice.

In addition, the voice synthesizer 106 calculates a time point at which output of a voice up to immediately before a tag included in a text of utterance contents ends or a period of time required to output voice from the start of the text up to immediately before the tag. The time point or the period of time can be calculated based on the text of the utterance contents and an utterance speed. The calculated period of time or time point is sent to the intention understanding unit 103.

Figure 2:
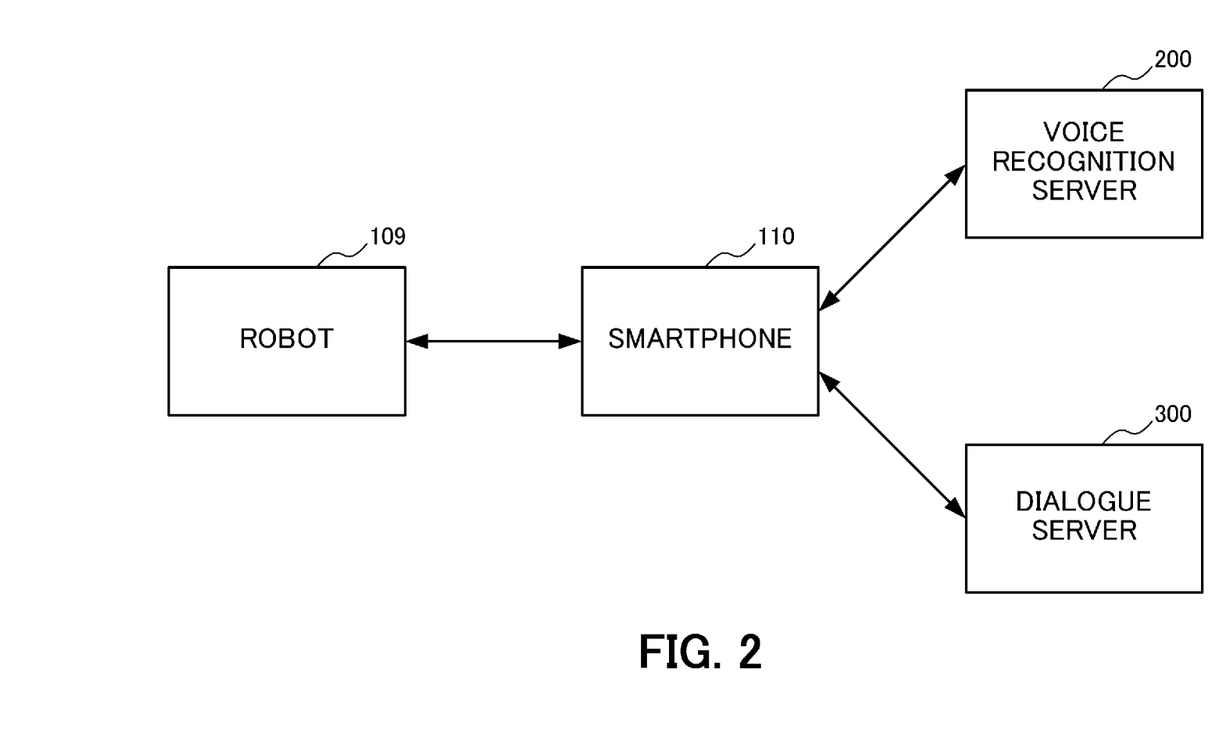
FIG. 2 is a diagram showing a configuration of a voice dialogue system according to a modification.

Moreover, the voice dialogue robot 100 need not be configured as a single apparatus. For example, as shown in FIG. 2, a two-apparatus configuration can be adopted with a robot apparatus 109 (a front end apparatus) including the microphone 101, the speaker 107, a camera, and movable joints and a smartphone 110 (or another computer) which executes various processing. In this case, the robot apparatus and the computer are connected by wireless communication such as Bluetooth (registered trademark), data acquired by the robot apparatus is sent to the computer, and reproduction of a response sentence or the like is performed by the robot apparatus based on a result of processing by the computer.

In addition, the voice recognition process and the dialogue text creation process need not be performed by the voice dialogue robot 100 and, as shown in FIG. 2, the processes may be performed by a voice recognition server 200 and a dialogue server 300. Alternatively, the processes may be performed by a single server. When the processes are performed using an external server in this manner, the smartphone 110 (or the robot apparatus 109) controls cooperation with the server.

<Processing>

Figure 3:
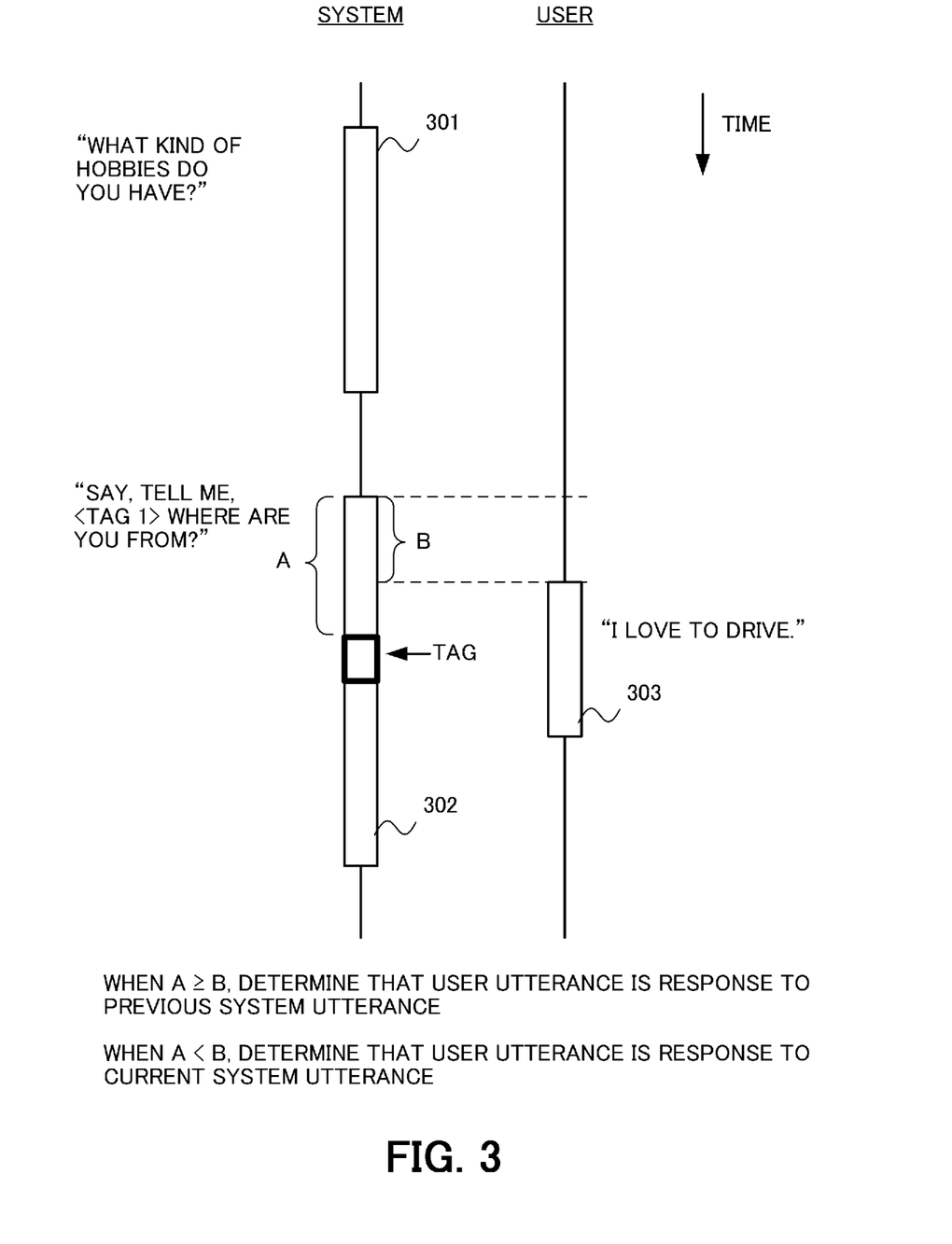
FIG. 3 is a diagram illustrating how an intention of a user utterance is understood by a voice dialogue system according to an embodiment.

FIG. 3 is a diagram schematically illustrating processing for determining an intention of a user utterance when a system utterance and the user utterance overlap each other in the present embodiment. In this case, an example will be described in which, after the system makes an utterance 301 of "What kind of hobbies do you have?", since the user does not return a response, the system successively makes an utterance 302 of "Say, tell me, where are you from?". The user makes an utterance 303 of "I love to drive" after a short delay from a start timing of the utterance 302. Since the utterance 302 and the utterance 303 overlap each other, a determination must be made as to whether the user utterance 303 is a response to the utterance 301 or a response to the utterance 302.

In this case, a text of the utterance 302 has been created by the dialogue text creator 105 by embedding a tag to read "Say, tell me, <1> where are you from?". In addition, the voice synthesizer 106 calculates a period of time A required for output from the start of the utterance 302 up to immediately before the tag <1>. Moreover, although the tag is not output as a voice as described earlier, hereinafter, for the sake of brevity, a tag will sometimes be described as though output as a voice such as referring to a timing at which output up to immediately before a tag is completed as an output timing of a tag.

The system can also acquire a period of time B between the start of the utterance 302 and the start of the utterance 303. In this case, when the start of the utterance 303 by the user is before a tag output timing (period of time A period of time B), a determination can be made that the utterance 303 by the user is a response to the previous utterance 301 by the system. This is because, since the tag is inserted before a body of a response sentence, it is appropriate to consider that a response prior to output of the body is not a response to the current utterance 302 but a response to the previous utterance 301.

In addition, when the start of the utterance 303 by the user is after the tag output timing (period of time A<period of time B), a determination can be made that the utterance 303 by the user is a response to the current utterance 302 by the system. This is because it is appropriate to consider that the user responds to the current utterance 302 after the system starts output of the body of the response sentence.

Hereinafter, details for realizing the processing shown in FIG. 3 will be described with reference to the flow charts in FIGS. 4 and 5.

Figure 4:
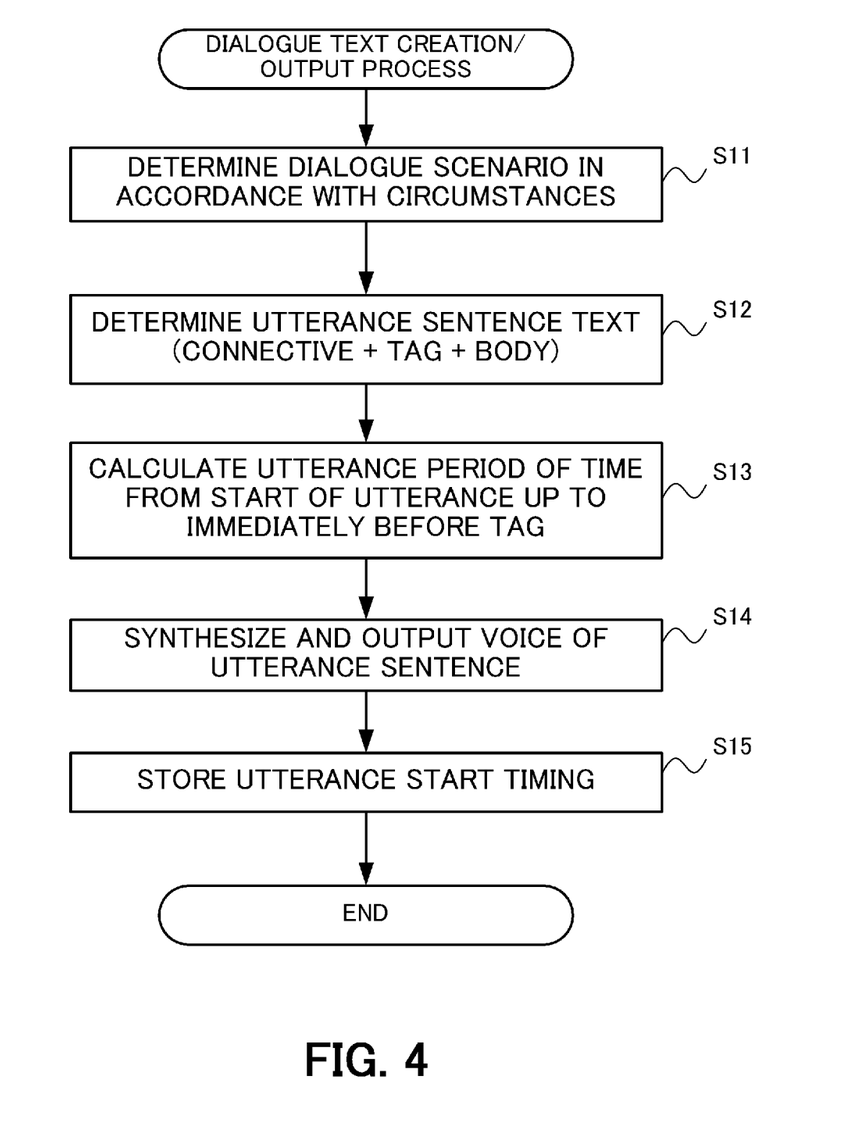
FIG. 4 is a diagram showing a flow of processing of dialogue text creation and output in a voice dialogue system according to an embodiment.

FIG. 4 is a flow chart showing a flow of processing for generating and outputting a dialogue text in the voice dialogue robot 100. In step S11, the dialogue text creator 105 determines a dialogue scenario (a conversation template) corresponding to circumstances. The circumstances as referred to herein are determined, for instance, based on various factors such as a recognition result of a user utterance, contents of previous dialogue, and a current time point or location. The dialogue text creator 105 includes a dialogue scenario database storing a plurality of dialogue scenarios (conversation templates), and contents of a system utterance and contents of further system utterances in accordance with expected user responses are described in a dialogue scenario. Contents of a part of system utterances in a dialogue scenario are specified so as to be determined in accordance with a response by the user or other circumstances. The dialogue text creator 105 selects a dialogue scenario conforming to current circumstances.

In step S12, the dialogue text creator 105 determines a text of an utterance sentence based on the selected dialogue scenario. While a method of determining an utterance sentence text is not particularly specified, in this case, a text of an utterance sentence is ultimately determined as a combination of a connective and a body. Examples of a connective include simple replies, interjections, and gambits such as "Yeah", "Is that so?", and "By the way" or a repetition of a part of the utterance contents of the user. The dialogue text creator 105 inserts a tag between the connective and the body to create a text of an utterance sentence. For example, texts such as "Hey, <1> what's your name?" and "By the way, <2> what's tomorrow's weather?" are generated.

Moreover, a combination of a connective, a tag, and a body may be stored in a dialogue scenario (a conversation template) or a dialogue scenario may only store a body and an appropriate connective may be selected to be added to the body together with a tag.

In step S13, a period of time required by an utterance from the start of the utterance up to a portion immediately preceding a tag is calculated and stored when the dialogue text creator 105 outputs a determined utterance text. The period of time from the start of an utterance to immediately before a tag can be obtained from an utterance speed setting in the voice synthesis process and from contents of the uttered text.

In step S14, the voice synthesizer 106 converts the utterance sentence text into voice data and outputs the voice data from the speaker 107. In step S15, a start timing of an utterance is stored.

Figure 5:
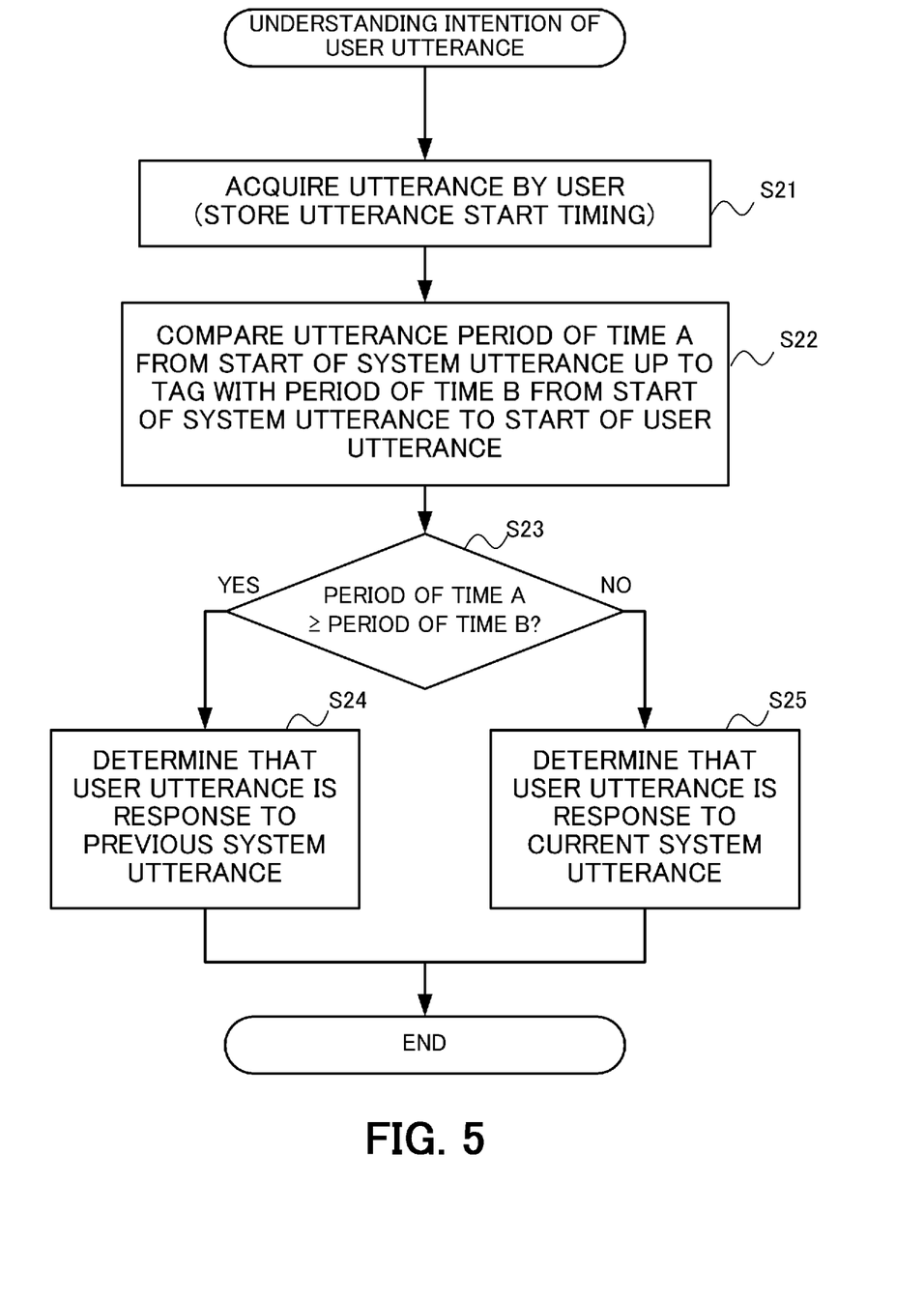
FIG. 5 is a diagram illustrating a flow of processing of understanding an intention of a user utterance in a voice dialogue system according to an embodiment.

FIG. 5 is a flow chart of an intention understanding process for determining whether or not a barge-in utterance by a user (in other words, a user utterance overlapping a system utterance) is intended as a response to a current system utterance. Moreover, although the intention understanding process of a user utterance in the voice dialogue robot 100 includes elements other than determining whether or not the user utterance is a response to a current system utterance, the following description will focus on the determination of whether or not the user utterance is a response to the current system utterance.

In step S21, an utterance by the user is acquired from the microphone 101. In doing so, a start timing of the user utterance is stored.

In step S22, the intention understanding unit 103 compares a period of time (the period of time A in FIG. 3) between an utterance start timing of a system utterance currently being output and an output timing of a tag in the system utterance with a period of time (the period of time B in FIG. 3) between the utterance start timing of the system utterance and an utterance start timing of the user utterance.

When the user utterance is before the output start timing of the tag in the system utterance or, in other words, when the period of time A≥the period of time B (S23—YES), in step S24, the intention understanding unit 103 determines that the user utterance is a response to a system utterance immediately preceding the current system utterance.

On the other hand, when the user utterance is after the output start timing of the tag in the system utterance or, in other words, when the period of time A<the period of time B (S23—NO), in step S25, the intention understanding unit 103 determines that the user utterance is a response to the current system utterance.

Advantageous Effects

According to the present embodiment, when a user utterance and a system utterance overlap each other, whether or not the user utterance is a response to a current system utterance can be determined with simple processing. Therefore, a dialogue between the system and the user can be realized in a more appropriate manner.

<Modifications>

In the embodiment described above, while only a result of a comparison between a timing of a user utterance and an output timing of a tag is taken into consideration in order to determine whether or not the user utterance is a response to a current system utterance, a final determination may be made in consideration of other elements. For example, a determination may conceivably be made by taking into consideration an association between contents of a last system utterance and a current system utterance and contents of a barge-in utterance by the user. As in the example shown in FIG. 3, in a case where the user makes an utterance of "I love to drive" when the system is successively asking "What kind of hobbies do you have?" and "Where are you from?", a determination can be made based on the association between contents that the user's utterance is a response to the previous system utterance ("What kind of hobbies do you have?") regardless of a timing of the user utterance. In this manner, it is also favorable to make a final determination in consideration of both a timing of a user utterance and an association between utterance contents.

In addition, while an example in which the system successively utters two questions has been described above, similar processing can also be applied when the user starts a conversation. In this case, a determination is made as to whether a user utterance is a response to a system utterance or a spontaneous start of a conversation. In other words, when a barge-in utterance by the user is not a response to a system utterance, it is understood that the user's intention is to start a conversation.

In addition, while a dialogue scenario (a conversation template) is used to create a dialogue text, a method of creating a dialogue text is not particularly limited. A dialogue text may be determined without using a dialogue scenario. Furthermore, an insertion position of a tag in a dialogue text is not limited to between a connective and a body and a tag need only be inserted at a position where effects of the present invention can be produced. In addition, a plurality of tags may be inserted into one response sentence, in which case an utterance intention of the user can be determined based on which of three or more sections divided by the tags a start of the user utterance corresponds to.

While the term "tag" is used in the description given above and expressions such as "<1>" are adopted in a response sentence text, a "tag" as used in the present invention refers to a specifier of a position in a response sentence and how the specifier is specifically expressed in a response sentence text is not limited. An arbitrary character string defined in advance or an arbitrary character string based on a rule defined in advance can be adopted in order to specify a position in a response sentence, in which case both arbitrary character strings correspond to a "tag" according to the present invention.

<Other>

The configurations of the embodiment and the modification described above can be used appropriately combined with each other without departing from the technical ideas of the present invention. In addition, the present invention may be realized by appropriately making changes thereto without departing from the technical ideas thereof.

What is claimed is:

1. A voice dialogue system, comprising:
   a voice input unit configured to acquire user utterances of a user;
   a dialogue text creator configured to create system utterances, wherein the dialogue text creator creates the system utterances based upon a stored history of dialogue performed in a past between the system and the user stored in a dialogue manager, the dialogue manager storing a time and date or location of the dialogue and enabling what kind of conversation had taken place with the user to be discerned and a response using previous dialogue as a reference to be generated;
   a voice output unit configured to output the system utterances as voice data; and
   a determiner configured to, in a case that a current user utterance is acquired while a system utterance is being output as voice data, determine whether or not the current user utterance acquired by the voice input unit is a response to a content that is output at a time of the current user utterance, wherein
   the system utterance comprises a connective portion for connecting following sentences and a content portion that is a subject of the system utterance,
   the content portion includes (a) a first content portion that is a first system utterance that is output before the connective portion and (b) a second content portion that is a second system utterance that is output after the connective portion,
   the first content portion is a first question and the second content portion is a second question different from the first question,
   the determiner determines, in a case that the current user utterance is acquired before the output of the second content portion has started, the current user utterance is a response to the first content portion, and
   the determiner determines, in a case that the current user utterance is acquired after the output of the second content portion has started, the current user utterance is a response to the second content portion.

2. The voice dialogue system according to claim 1, wherein the connective portion comprises one of an interjection, a gambit, or a repetition of a part of a previously acquired user utterance.

3. The voice dialogue system according to claim 2, wherein the dialogue creator is further configured to, when creating the system utterances, to insert an unvoiced tag between the connective portion and the content portion of the system utterances, and the determiner is further configured to determine that the output of the content portion of the system utterance has started based at least on a position of the unvoiced tag in the system utterance.

4. The voice dialogue system according to claim 2, wherein the determiner is further configured to:

calculate a first period of time that is a period of time that it will take to output the connective portion of the system utterance as voice data;

acquire a second period of time that is a period of time from a start of output of the system utterance as voice data to a start of the acquired current user utterance; and compare the first period of time and the second period of time with each other to determine whether the current user utterance is acquired after the output of the content portion of the system utterance has started or before the output of the content portion of the system utterance has started.

5. The voice dialogue system according to claim 1, wherein the determiner is further programmed to function as an intention understanding unit storing a corpus or a dictionary for interpreting utterance contents and interpreting a user utterance by referring to the corpus or the dictionary.

6. The voice dialogue system according to claim 1, wherein the voice dialogue system includes a voice dialogue robot having movable joints, the voice dialogue robot configured to function as the voice input unit, the dialogue text creator, the voice output unit and the determiner.

\* \* \* \* \*